United States Patent

[11] 3,587,679

| [72] | Inventor | Joseph Conte<br>1521 Mt. Read Blvd., Rochester, N.Y. 14606 |
|---|---|---|
| [21] | Appl. No. | 821,923 |
| [22] | Filed | May 5, 1969 |
| [45] | Patented | June 28, 1971 |

[54] PORTABLE CABLE SAW
1 Claim, 6 Drawing Figs.

[52] U.S. Cl. ........................................... 143/32,
143/17, 143/135, 30/166, 125/21
[51] Int. Cl. ........................................... B27b 17/02,
B27b 33/16
[50] Field of Search.......................................... 143/32,
135-1, 135, 133-4, 17, 19 (Inquired); 125/21;
83/201-1; 30/166

[56] References Cited
UNITED STATES PATENTS

| 1,786,641 | 12/1930 | Berg | 143/32 |
| 2,349,573 | 5/1944 | Anderson | 143/135(-1) |
| 2,380,753 | 7/1945 | Hard | 143/135(-1) |
| 3,301,285 | 1/1967 | Cline | 143/133(-4)X |
| 3,509,704 | 5/1970 | Henzman | 143/135(-1)X |

*Primary Examiner*—Donald R. Schran
*Attorneys*—William D. Hall, Elliott I. Pollock, Fred C. Philpitt, George Vande Sande, Charles F. Steininger and Robert R. Priddy ABSTRACT: A portable power saw, similar in function to a chain saw, but comprising an endless steel cable with cutting teeth thereon instead of an endless chain. The teeth may be spot welded to the flexible cable, and the inside of the loop of cable is provided with a plurality of inwardly extending cog members which fit into recesses on a drive wheel.

PATENTED JUN28 1971 3,587,679
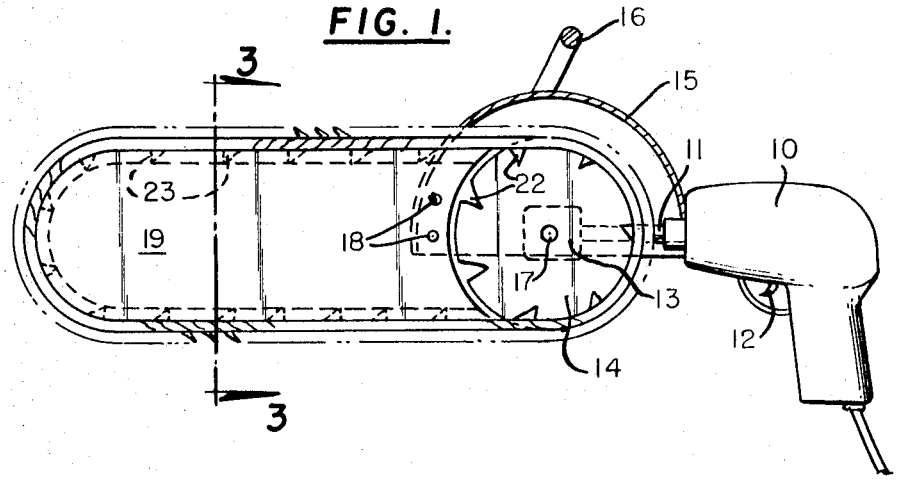
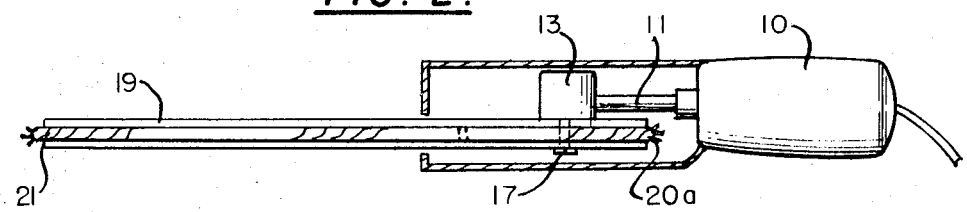
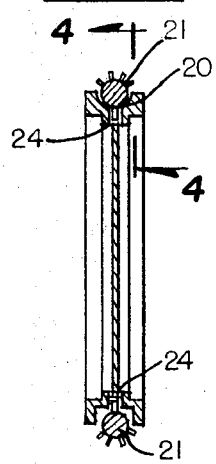
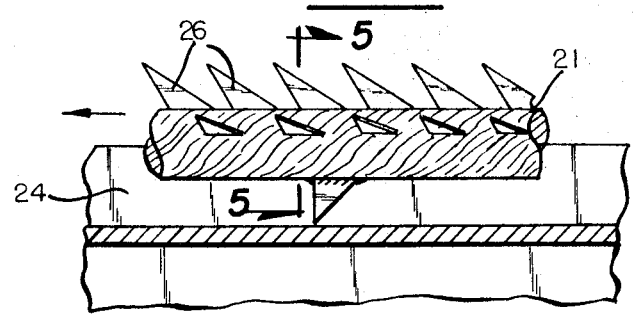
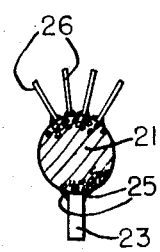
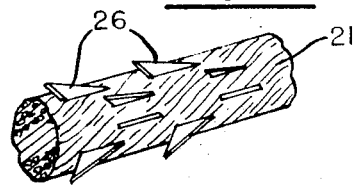
INVENTOR
Joseph Conte
BY Hall, Pollock, > Vande Sande
ATTORNEY

PORTABLE CABLE SAW

BACKGROUND OF THE INVENTION

Chain saws for the cutting of trees and lumber, etc. are in wide use. Some are powered by electric motors and some by internal combustion engines. Such a saw comprises generally an elongate steel plate having curved ends and forming a track about its periphery for a flexible steel chain, the individual links of which carry sharpened metallic teeth. A source of motive power causes the endless chain and its teeth to be driven at a rapid rate around the endless track so that the teeth can cut into the material which is desired to be cut.

Although chain saws have considerable utility, they are also susceptible to considerable maintenance problems. Thus, it is necessary to keep the chain well lubricated at all times and with a proper amount of tension, and even then breakage of the chain can quite readily occur. When the chain is broken, it cannot readily be repaired, and replacement of the chain with a new one not only involves considerable expense but also means that the saw cannot be used for a time until the chain is replaced, which problem is of course considerably aggravated if a replacement chain is not readily available.

The saw of the present invention is constructed to overcome the several disadvantages just described. Thus, the saw presents fewer maintenance problems because it comprises fewer parts which are subject to frictional wear. Moreover, in the event that the teeth-bearing cable becomes broken for any reason, it can quite readily be replaced and at quite low cost.

SUMMARY OF THE INVENTION

The saw of the present invention comprises an elongate plate member defining a peripheral groove which is adapted to receive an endless cutting member formed of a flexible steel cable. The cable has welded thereto a myriad of sharp cutting teeth which enable the saw to cut quite readily through a piece of wood or similar material. The saw of the invention is particularly intended for use by contractors and builders as its light weight and high cutting speed facilitate its use for many cutting tasks. A drive wheel is provided which is driven by an electric motor or internal combustion engine or the like, and the drive wheel not only includes a peripheral groove for receiving the toothed cable but also is formed with a plurality of spaced inwardly extending recesses in its peripheral portion which receive properly spaced cog members that are welded to the toothed cable, thereby providing a positive drive between the driving member and the cable. The groove in the elongate plate is of sufficient depth to provide adequate clearance for the cogs on the cable so that the cable can freely traverse the plate.

It is contemplated that a user of the saw of this invention will also have available to him a quantity of the toothed cable, having the cog members attached thereto, for replacement purposes. Thus, it is contemplated that the cable may be made available for purchase in any desired length so that a user can always have available to him a spare length of cable in the event that the cable on the saw breaks or otherwise becomes unuseable. If this happens, it is then only necessary for the user to place a new length of cable in the endless track and weld (or otherwise couple) together the two ends thereof to form a continuous loop so that the saw can readily be returned to operation.

BRIEF DESCRIPTION OF THE DRAWINGS

FIG. 1 is a side view of the cable saw of the present invention;
FIG. 2 is a top view of the saw of FIG. 1;
FIG. 3 is a sectional view taken along the section line 3-3 of FIG. 1;
FIG. 4 is a sectional view taken along the section line 4-4 of FIG. 3;
FIG. 5 is a sectional view taken along the section line 5-5 of FIG. 4; and
FIG. 6 is an enlarged perspective view of a short segment of the cable bearing the cutting teeth.

BRIEF DESCRIPTION OF THE PREFERRED EMBODIMENT

FIGS. 1 and 2 disclose the cable saw of this invention as comprising a source of motive power and having an output shaft 11 which rotates whenever a switch is closed as by operation of the triggerlike switch member 12. A gear box 13 is coupled to the shaft 11, and the output of the gear box 13 is coupled by a means (not shown) to produce rotation of the disclike drive wheel 14. A frame member 15 (partly cutaway) having a handle portion 16 for carrying and otherwise supporting the saw is coupled to the bearing 17 for disc 14 and is also mechanically coupled, as by bolts 18, to an elongate, flat plate member 19.

The member 19 is provided with a peripheral groove 20 as shown in the cross-sectional view of FIG. 3. A similar groove 20a is provided in the circumferential edge of disc member 14. The grooves in both plate 19 and disc 14 receive an endless flexible cable 21, preferably of steel, which cable runs longitudinally along the endless slot.

The circular disc 14 is also provided with a plurality of circumferentially spaced recesses 22 which extend inwardly from the circumferential groove 20a provided therein. The purpose of the recesses 22 is to receive the spaced cog members 23 which are secured at spaced intervals to the flexible cable 21. Since the circular disc 14 is driven by motor 10, the function of the recesses 22 and cogs 23 is to provide a positive drive which will cause the cable 21 to move at high speed through the grooves 20, 20a even when the cable is under load, i.e. when it is cutting through a tree or board or the like.

As shown in FIGS. 3 and 4, a deeper recess 24 extends inwardly in plate 19 from the peripheral groove 20, and the function of this deeper recess 24 is to provide a path for the cog members 23 so that they can readily slide around the periphery of flat plate 19.

The flexible cable is shown in cross section in FIG. 5. The cable may comprise a flexible steel wire rope, and a typical one of the cog members 23 is shown as being spot welded at 25 to the cable 21. Diametrically opposite the cog 23 are a plurality of hardened steel cutting teeth 26 which are spaced both longitudinally and circumferentially about the cable 21 in such manner that the spread between the outermost teeth, circumferentially around cable 21, is sufficiently great so that the kerf which is cut by the cable will be slightly greater than the cable diameter, and also wider than the thickness of either plate 19 or disc 14, thereby providing clearance for the saw as it cuts through any material.

FIG. 6 shows four longitudinal rows of teeth 26 secured to cable 21, but obviously more or less rows of teeth may be provided as desired. Both FIGS. 4 and 6 show that the cutting teeth 26 may be generally of triangular shape, with each tooth being spot welded to cable 21. For teeth of this shape, it is contemplated that the direction of movement of the cable would be in the direction of the arrow shown in FIG. 4.

As previously mentioned, cutting cable as shown in FIGS. 5 and 6 may be made available in any convenient length. In the event of a breakage of the cable on the saw, a replacement length of cable may be cut to desired length, placed in its groove about members 14 and 19, and the ends thereof either welded together or secured by a suitable coupling member (not shown).

I claim:
1. A power driven saw comprising in combination,
a stationary flat plate and a circular flat disc coplanar with said plate,
both said plate and said disc having peripheral grooves for receiving a cable,
said cable having welded thereto along its length and on its outer surface a myriad of small, sharp, cutting teeth which are circumferentially spaced over a portion of the circumference of said cable to provide a kerf which is wider than the thickness of said plate and said disc,
said cable also having welded thereto a plurality of spaced cogs at uniform intervals and each located substantially diametrically opposite said cutting teeth, said disc having a plurality of circumferential recesses having a circumferential spacing which substantially corresponds to the uniform spacing of said cogs on said cable for receiving said cog, said plate further defining along its periphery a recess extending inwardly from said peripheral groove to provide a sliding clearance for said cogs on said cable, and power means for rotating said disc to thereby drive said cable over said peripheral grooves.